(12) United States Patent
Bell et al.

(10) Patent No.: US 8,639,886 B2
(45) Date of Patent: Jan. 28, 2014

(54) STORE-TO-LOAD FORWARDING MECHANISM FOR PROCESSOR RUNAHEAD MODE OPERATION

(75) Inventors: Gordon Bell, Research Triangle Park, NC (US); Anil Krishna, Cary, NC (US); Srinivasan Ramani, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 12/364,984

(22) Filed: Feb. 3, 2009

(65) Prior Publication Data

US 2010/0199045 A1    Aug. 5, 2010

(51) Int. Cl.
*G06F 12/08*    (2006.01)

(52) U.S. Cl.
USPC .................................. 711/137; 711/E12.057

(58) Field of Classification Search
USPC .......................................... 711/137, E12.057
See application file for complete search history.

(56) References Cited

U.S. PATENT DOCUMENTS

| 6,189,087 B1 * | 2/2001 | Witt et al. ..................... 712/208 |
| 7,188,234 B2 | 3/2007 | Wu et al. |
| 2002/0116584 A1 | 8/2002 | Wilkerson |
| 2004/0128448 A1 | 7/2004 | Stark et al. |
| 2005/0138332 A1 | 6/2005 | Kottapalli et al. |
| 2006/0095678 A1 | 5/2006 | Bigelow et al. |
| 2006/0149931 A1 * | 7/2006 | Haitham et al. ............... 712/218 |
| 2008/0028183 A1 | 1/2008 | Hwu et al. |

FOREIGN PATENT DOCUMENTS

| EP | 1460532 | 9/2004 |
| JP | 2006318051 | 11/2006 |

OTHER PUBLICATIONS

Mutlu et al. "Efficient Runahead Execution: Power Efficient Memory Latency Tolerance", Feb. 2006 IEEE Computer Society pp. 10-20.*

* cited by examiner

*Primary Examiner* — Kenneth Lo
(74) *Attorney, Agent, or Firm* — Yudell Isidore Ng Russell PLLC

(57) ABSTRACT

A system and method to optimize runahead operation for a processor without use of a separate explicit runahead cache structure. Rather than simply dropping store instructions in a processor runahead mode, store instructions write their results in an existing processor store queue, although store instructions are not allowed to update processor caches and system memory. Use of the store queue during runahead mode to hold store instruction results allows more recent runahead load instructions to search retired store queue entries in the store queue for matching addresses to utilize data from the retired, but still searchable, store instructions. Retired store instructions could be either runahead store instructions retired, or retired store instructions that executed before entering runahead mode.

18 Claims, 4 Drawing Sheets

STORE-TO-LOAD FORWARDING MECHANISM FOR PROCESSOR RUNAHEAD MODE OPERATION

BACKGROUND OF THE INVENTION

1. Technical Field

The present invention relates in general to the field of computers, and in particular to an improved store-to-load forwarding scheme for processor runahead mode operation in a computer system which does not require a separate runahead cache structure in the processor.

2. Description of the Related Art

Historically, improvements in semiconductor memory latencies have failed to keep pace with corresponding increases in instruction processing speed of processors in computer systems. This is known as the "memory wall" and represents an increasing opportunity cost for execution by a processor of a storage instruction that "misses" the processor cache (i.e., the data being sought is not valid/available in the cache) and which must instead access main system memory directly. In existing technology generations, a last-level processor cache miss often stalls a processor for hundreds of processor cycles which can translate into thousands of missed instruction execution opportunities.

Out-of-order (OoO) execution in a processor has been used to mitigate the "cache miss" effect by speculatively pre-executing more recent independent instructions while waiting for a cache miss operation, to retrieve data directly from the system memory, to complete. This period of time is quite lengthy and causes inefficiency in processor operation, because the more recent instructions cannot be retired before the miss completes, and therefore they must be buffered within a processor core. A variety of microarchitectural resource and design constraints make scaling a processor buffer for storing the more recent instructions inherently difficult. Therefore, the number of outstanding unretired instructions is typically limited to a number far less than that required to fully compensate for and to resolve the processor cache miss latency problem.

The primary benefit of using OoO execution to speculatively pre-fetch and pre-execute instructions after a cache miss, but prior to cache miss completion, is to start pre-executing more recent independent instructions as early as possible after a detected cache miss. In this way, the latency of multiple independent cache misses can be overlapped with each other, which leads to improved processor performance. Runahead execution has been proposed as a prefetching mechanism to accomplish this. The functions associated with such a proposed runahead execution scheme are as follows:

1. When a last-level processor cache load miss is detected, the architected state of the processor state is checkpointed (i.e., the state of processor registers is copied to a checkpoint location in the system memory) and the processor enters runahead mode.

2. While in runahead mode, which occurs after a cache miss is detected, load instructions that miss the last-level processor cache do not wait for data to return from system memory. Instead, they immediately execute, and their respective result register is marked with a special not-a-value (NAV) bit to indicate the presence of a fictional value, as a place holder in the result register. Instructions that read a result register marked NAV cannot perform a useful computation, and are therefore skipped after they propagate the NAV bit to their respective destination register(s).

3. While functionally incorrect, load instruction misses, and their dependent instructions, are retired from the processor in the computer system and do not inhibit execution of more recent instructions.

4. When the initial load miss that caused a transition to runahead mode finally returns valid data from memory, an architected processor state is restored from the checkpoint location and execution resumes in the processor with the next instruction after the load miss instruction.

Because execution of instructions beyond the initial load miss leads to potentially incorrect results, since the subsequent instructions may be utilizing non-valid data resulting from instructions executing after the load miss because the load miss instruction has not yet returned valid data from memory, execution of instructions subsequent to the load miss instruction is required to eventually be "squashed" and restarted at that point. However, execution of instructions beyond the initial load miss instruction may still generate useful pre-fetches by uncovering load misses on those pre-fetched instructions independently of the initial load miss. Because execution of instructions in runahead mode is not limited by correctness requirements and does not wait for long-latency instructions to complete, instructions are allowed to execute arbitrarily into the future without stalling the processor. However, any architected processor state updates that occur during runahead mode must be "undone" during the transition back to the normal (non-runahead) mode of operation. Restoring execution of instructions from a previous checkpoint location accomplishes the "undoing" for register write instructions, since an architected processor register file is part of the checkpoint location; however, reversing the effects of system memory write instructions can be difficult.

One proposed solution is to simply drop store instructions executed during runahead mode. While conceptually simple, more recent load instructions that source the store instructions would receive stale data. However, if load data contributes toward "cache miss" address generation, the prefetching effect of this technique is diminished. Another proposed solution is to add a small separate explicit processor "runahead cache" structure designed to buffer speculative data produced by store instructions during runahead mode. Using the separate explicit runahead cache, upon exiting runahead mode, the processor runahead cache is cleared. However, while effective at propagating values between store instructions and load instructions, a processor runahead cache would consume additional chip area and power in the processor, and is therefore undesirable.

Thus, there is a need for an improved optimization scheme for a processor in a computer system which is effective at propagating values between store instructions and load instructions during processor runahead mode operation but which does not require any additional storage structure(s) in the processor.

SUMMARY OF THE INVENTION

Disclosed is a system and method to optimize runahead operation for a processor without use of a separate explicit runahead cache structure. Rather than simply dropping store instructions in a processor runahead mode, store instructions write their results in an existing processor store queue, although store instructions are not allowed to update processor caches and system memory. Use of the store queue during runahead mode to hold addresses and data associated with previously executed store instructions allows more recent runahead load instructions to search retired store entries in the store queue for matching addresses to utilize data from the retired, but still searchable, store instructions.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
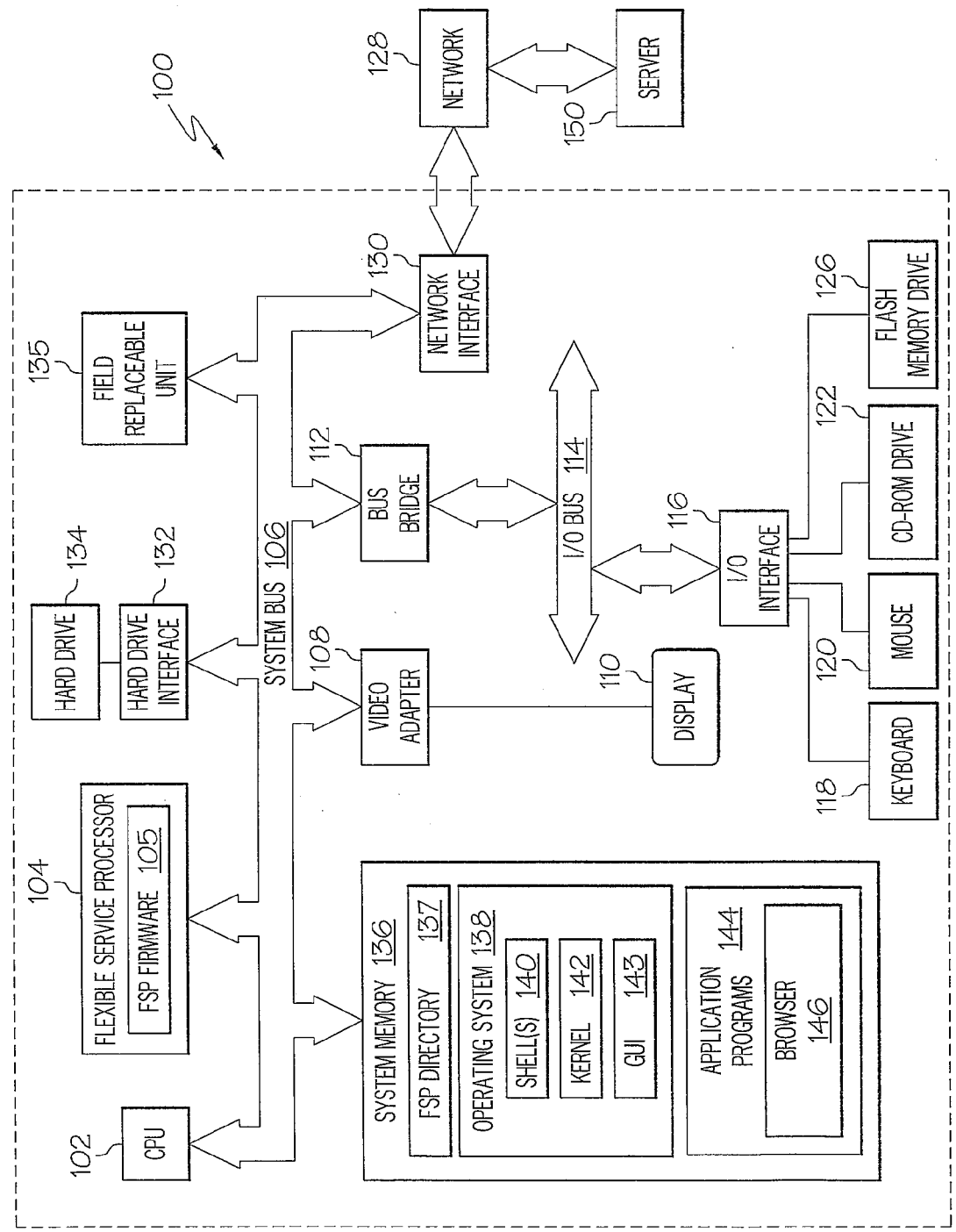
FIG. 1 depicts a high level block diagram is depicted of a computer, with which an embodiment of the present invention may be utilized.

Reference will now be made in detail to the embodiments of the present invention, examples of which are illustrated in the accompanying drawings, wherein like reference numerals refer to the like elements throughout. The embodiments are described below in order to explain the present invention by referring to the figures. The specific reference numerals assigned to the elements are provided solely to aid in the description and are not meant to imply any limitations (structural or functional) on the present invention.

The present invention provides a system and method to optimize runahead operation for a processor without use of a separate explicit runahead cache structure. Rather than simply dropping store instructions in a processor runahead mode, store instructions write their results in an existing processor store queue, although store instructions are not allowed to update processor caches and system memory. Use of the store queue during runahead mode to hold addresses and data associated with previously executed store instructions allows more recent runahead load instructions to search retired store entries in the store queue for matching addresses to utilize data from the retired, but still searchable, store instructions.

Referring to FIG. 1, a high level block diagram is depicted of a computer 100, with which the present invention may be utilized. Computer 100 includes central processing unit (CPU) 102, which is coupled to system bus 106. Computer 100 also includes flexible service processor (FSP) 104, which is coupled to system bus 106. FSP 104 includes FSP firmware 105.

Video adapter 108, which drives/supports display 110, is also coupled to system bus 106. System bus 106 is coupled via Bus Bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including, but not limited to, Universal Serial Bus (USB) ports.

Computer 100 is able to communicate with server 150 via network 128 using one or more network interface 130 which is coupled to system bus 106. Network interface 130 may be a network communication adapter (network adapter), such as an Ethernet controller where the network 128 is an Ethernet network. Network 128 may be an external network such as the Internet, or an internal network such as a Local Area Network (LAN), an Ethernet, or a Virtual Private Network (VPN). The server 150 may be configured similarly to computer 100.

Hard drive interface 132 is also coupled to system bus 106. Hard drive interface 132 interfaces with hard drive 134. Hard drive 134 may populate system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes FSP directory 137, Operating System (OS) 138, and application programs 144.

OS 138 includes shell 140, for providing transparent user access to resources such as application programs 144. Generally, shell 140 (as it is called in UNIX®) is a program that provides an interpreter function and an interface between a user and the operating system. Shell 140 provides a system prompt, interprets commands entered by a user on keyboard 118, mouse 120, or other user input media, and sends the interpreted command(s) to the appropriate lower levels of the operating system (e.g., kernel 142) for processing. As depicted, OS 138 also includes Graphical User Interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management. OS 138 may provide a GUI to be displayed on display 110.

Application programs 144 include browser 146. Browser 146 includes program modules and instructions enabling a World Wide Web (WWW) client (i.e., computer 100) to send and receive network messages to and from the Internet. Computer 100 may utilize HyperText Transfer Protocol (HTTP) messaging to enable communication with server 150.

Figure 2:
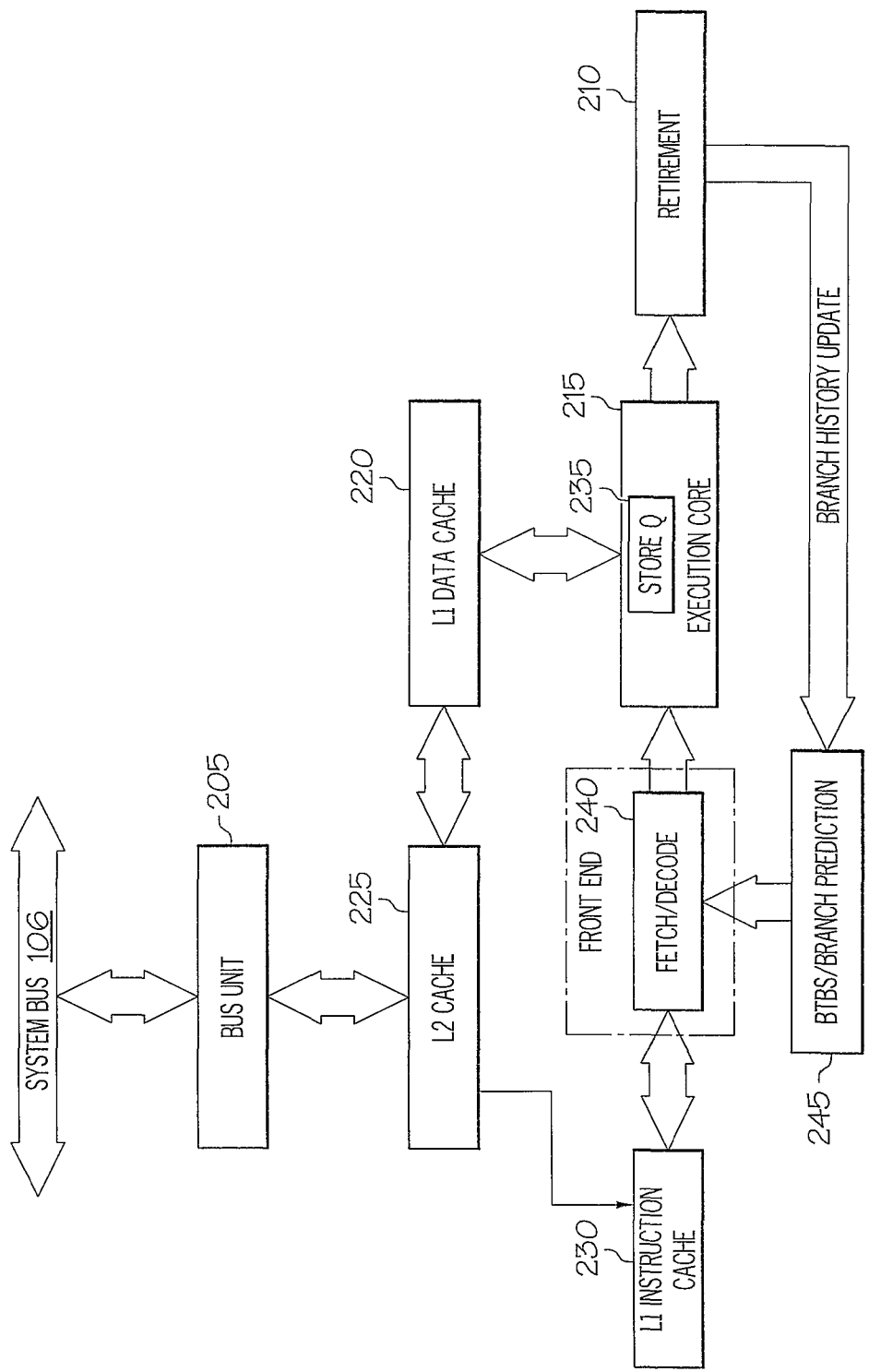
FIG. 2 depicts a high level functional block diagram of a processor which can be utilized in accordance with the present invention.

Referring to FIG. 2, there is depicted a high level functional block diagram of a processor 200 which can be utilized in accordance with the present invention. The processor 200 may be the CPU 102 of the computer 100 of FIG. 1. In general, an L2 cache 225 sends data to, and receives data from, respectively, the system memory 136 (FIG. 1) via the bus unit 205 and the system bus 106. An L1 cache for the processor 200 may be a single unit, or may be configured, as depicted in FIG. 2, with an L1 data cache 220 and an L1 instruction cache 225. A processor execution core 215 executes all processor instructions, including load and store instructions. A load instruction reads data from a location in the processor 200 memory hierarchy (i.e., L1 data cache 220, L2 cache 225, system memory 136, etc.). A store instruction writes data to a location in the processor 200 memory hierarchy. The execution core 215 includes a FIFO configured as a store queue 235 that includes data and address entries for all store instructions in the pipeline and/or being executed by the processor 200. The "front end" of the processor 200 includes a fetch/decode block 240, as depicted, to fetch instructions from the L1 instruction cache 225 to be executed by the execution core 215. The BTBs/Branch Prediction block 245 performs decoding of instructions in advance to keep the instruction pipeline for the processor 200 full, for efficient operation.

Conventional Out-of-order (OoO) execution of instructions by the processor 200 allows speculative values produced by in-flight store instructions during runahead mode to be forwarded to younger load instructions (i.e., instructions that are more recent than a load instruction which has caused a cache miss condition). Values produced by store instructions which have executed, but not yet been retired by the retirement block 210 reside in store entries (described below) in the store queue 235, such that during runahead mode operation, a load instruction searches the entire store queue 235 for older load instructions having the same address. If an address match occurs, data is read from the respective entry of the store queue 235 and is then processed by the load instruction. If no address match occurs with the store queue 235, then the load instruction accesses the processor 200 memory hierarchy (as described above) to retrieve the most recent value written to the respective address. When a store instruction is retired by the retirement block 210, its corresponding address and data entry is also removed from the processor store queue 235. Retired store instructions are instructions which have been executed by the processor 200, have become the oldest in-flight instruction within a core (not shown) of the processor 200, and have had their data copied from the store queue 235 to system memory 136.

The above-described forwarding of speculative values for younger load instructions is less likely to occur during processor runahead mode operation than during normal processor operation, since load instruction cache misses do not prevent store instruction retirement by the retirement block 210, and therefore do not cause the store queue 235 to become filled with unretired store instruction address and data entries. That is, when a load instruction executes during processor runahead mode, it is likely that a prior store instruction having its respective address has already flowed through the processor 200 and has been retired, thereby removing the corresponding address and data store entry from the store queue 235.

Since the present invention does not utilize a separate explicit processor runahead cache structure to store results of store instructions during runahead mode, store entries containing associated address and data of retired store instructions remain stored in the store queue 235 for use by younger load instructions for the same respective address. Since the L1 processor data cache 220 and the L2 processor cache 225 do not contain data updated by instructions executed during runahead mode, nor do any other cache in the processor memory hierarchy associated with the processor 200, access by younger load instructions to the address and data store entries in store queue 235 for executed, but not yet retired, store instructions provides a mechanism by which load instructions during runahead mode may obtain the results of the retired store instructions without a need for a separate explicit processor runahead cache structure. Using the store queue 235 of the present invention instead of a separate processor cache results in processor power savings and a less complicated processor design.

Figure 3A:
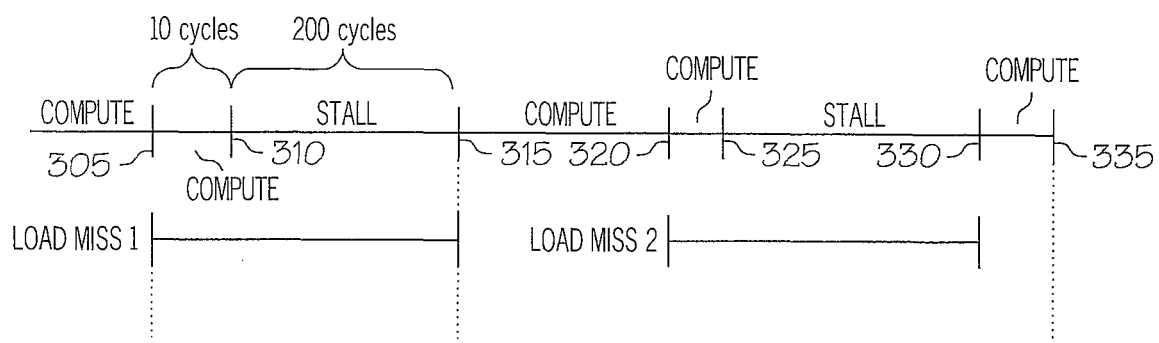
FIG. 3A depicts a conventional method of normal processor operation for execution of instructions during a "load miss" is depicted.

Referring to FIG. 3A, a conventional method of processing instructions in processor 200 during a "load miss" is depicted, where the processor 200 executes instructions until a load instruction miss (load miss 1) of a cache (e.g., L1 data cache 220) occurs at line 305. After the load miss, the processor 200 completes execution during a short period of time after line 305 (e.g., approximately 10 processor clock cycles) and then enters a stall (latency) period for a much longer period of time (e.g., approximately 200 processor clock cycles) beginning at line 310 while the load instruction which "missed" retrieves data directly from the system memory 136. During this stall time, which begins at line 310, no further instructions subsequent to the load miss 1 are executed by the processor 200.

After the load miss 1 completes the retrieval of needed data from the system memory 136, the processor 200 resumes executing instructions at line 315 and continues executing instructions until a second load miss (load miss 2) occurs at line 320. Once again, processor 200 completes execution between lines 320 and 325 and then enters another execution stall period at line 325, which last until line 300 for another long period of time (e.g., approximately 200 processor clock cycles). When the load miss 2 completes retrieval of needed data from the system memory 136 at line 330, the processor 200 again resumes executing instructions and continues executing instructions until it completes execution at line 325.

Figure 3B:
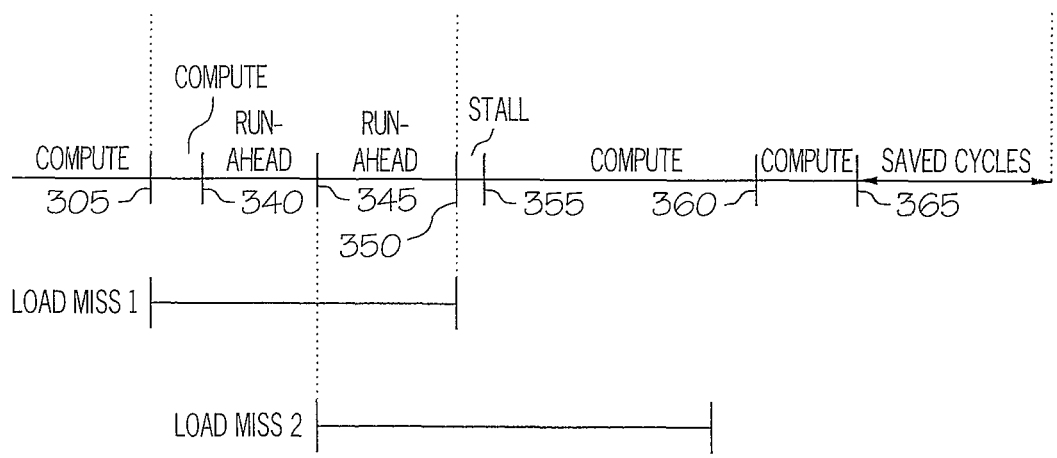
FIG. 3B depicts a method of processing instructions during a "load miss" using runahead mode operation used in accordance with the present invention.

Referring to FIG. 3B, a method of processing instructions in processor 200 during a "load miss" in runahead mode operation in accordance with the present invention is depicted, where the processor 200 executes instructions until a first load instruction miss (load miss 1) of a cache (e.g., L1 data cache 220 miss) occurs at the line 305. After the load miss 1, the state of the processor 200 is copied to a restore point in the system memory 136, while processor 200 completes execution during a short period of time (e.g., approximately 10 processor clock cycles) from line 305 to line 340 and then enters runahead mode operation for a long period of time (e.g., approximately 200 processor clock cycles) at line 340 while the load instruction which "missed" retrieves data directly from the system memory 136 and instructions subsequent to load miss 1 continue to be executed by processor 200.

Prior to the time load miss 1 completes retrieval of needed data from the system memory 136, the processor 200 may encounter a second subsequent load miss (load miss 2) at line 345 which may cause a small amount of stall time in processor 200, as depicted between lines 350 and 355. However, if the load miss 1 completes its retrieval of needed data from the system memory 136 prior to the arrival of the load miss 2 at line 345, there may be no stall period at that point in time for the processor 200. However, even with the depicted brief period of stall time, at line 355 the processor 200 again begins execution of instructions from the checkpointed state of processor 200. That is, after the load miss 1 completes retrieval of needed data at line 350, the state of the processor 200 is retrieved from the restore point in system memory 136, and the first instruction subsequent to the load miss 1 instruction begins being executed by processor 200. Meanwhile, the load miss 2 completes its retrieval of needed data from the system memory 200 at line 360. Thereafter, at line 365, the processor 200 completes execution.

As can be seen in reference to a comparison of FIG. 3A and FIG. 3B, use of the runahead mode depicted in FIG. 3B results in significant opportunity cost savings for the processor 200, as measured in processor clock cycles, between the time of completion of execution of the load miss 2 and all other execution in FIG. 3A at line 335 using a conventional operation of processing instructions, and the time of completion of the load miss 2 and all other execution in FIG. 3B using a runahead mode operation in accordance with the present invention, where execution after completion of load miss 2 occurs at line 365.

Figure 4A:
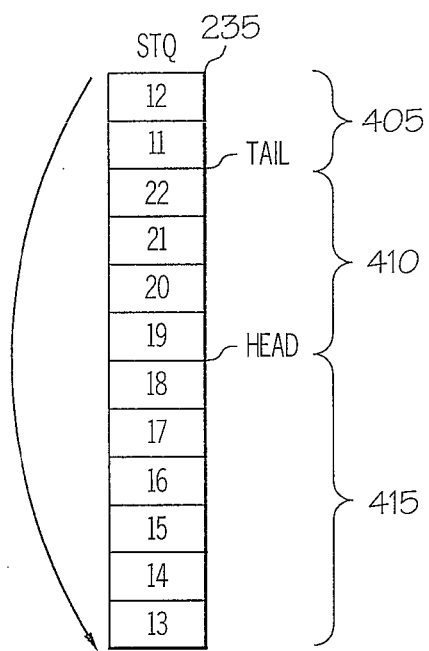
FIG. 4A depicts a conventional store queue.

In FIG. 4A, store entries 12, 11, 22, etc. of a conventional store queue 235 are depicted. As described above, the store queue 235 may be configured as a FIFO in the processor 200, where respective addresses and data associated with a plurality of retired and unretired store instructions are stored. Preferably, store queue 235 has a revolving or circular configuration, such that addresses and data associated with a youngest unretired store instruction is written over the addresses and data associated with an oldest retired store instruction. As described above, retired store instructions are instructions which have been executed by the processor 200, have become the oldest in-flight instruction within a core (not shown) of the processor 200, and have had their data copied from the store queue 235 to system memory 136. Unretired store instructions are instructions which have been executed by the processor 200, but have not yet had their store data copied to system memory 136. The invalid data results since the instruction was executed while processor 200 was in runahead mode. In the example of FIG. 4A, the head pointer is pointed to store entry 18, which has an address and data associated with the oldest unretired store instruction. The tail pointer is pointed to the store entry 22 which has an address and data associated with the most recent (youngest) unretired store instruction.

In a processor 200 having a conventional store queue 235 configuration as depicted in FIG. 4A, forwarding of speculative values produced by each store instruction in runahead mode is supported, but requires use of an undesired separate explicit processor runahead cache structure (not shown) to store address and data values to be used by the load instruction while executing in runahead mode. The store queue 235 utilizes the head pointer and tail pointer to indicate, respectively, the oldest and youngest un-retired store instruction address and data in the processor 200.

Entries 410 of the store queue 235 located between the head and tail pointers of the store queue 235 correspond to store instructions that are executing, but have not yet been retired from the pipeline and updated memory. In a conventional store queue 235, there is no need to access store entries 405 and 415 since store instruction data in conventional runahead mode which results from execution of instructions during runahead mode is not used to update the processor 200 memory hierarchy (described above) since the data may not be valid. In this example, the head pointer is incremented when store instructions (and their respective associated address and data stored in the store queue 235) are retired. The tail pointer is incremented when an address and data associated with more recent store instructions are inserted in the front end of the pipeline.

Figure 4B:
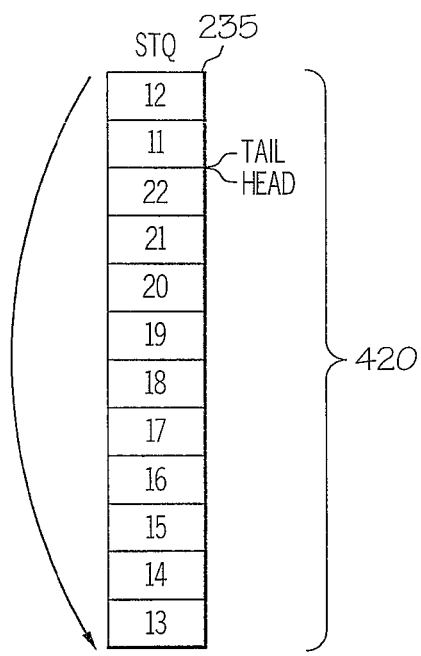
FIG. 4B depicts a store queue used in accordance with the present invention.

In contrast, in a processor 200 having a store queue 235 configuration in accordance with the present invention, as depicted in FIG. 4B, forwarding of speculative values produced by each load instruction in runahead mode is supported without the need of a separate explicit runahead cache structure, such that the store queue 235 head pointer is incremented in runahead mode only when the store queue 235 is full and an additional store queue 235 entry needs to be added to prevent an insertion stall (i.e., to prevent a lack of instructions in the pipeline for the processor 200 to execute). The head pointer and tail pointer both point to the same store entry, for example, store entry 11.

The optimization scheme of the present invention allows all store entries 420 to be searched by younger load instructions during runahead mode, where the store entries 420 include both retired and un-retired store instruction data and addresses stored in the store queue 235. This allows younger load instructions to match addresses in the store queue 235 during runahead mode to obtain data of retired, but still existing, store instructions to allow the younger load instructions to utilize the data of the re-tired but still existing store instructions for which there is an address match. Retired store instructions could be either runahead store instructions retired, or retired store instructions that executed before entering runahead mode. This essentially accomplishes a forwarding of data from the older re-tired store instructions to the younger executing load instructions which need the forwarded data to properly execute with valid data during runahead mode operation of the processor 200.

Buffering the data of retired store instructions in the store queue 235 and allowing their corresponding store entries in the store queue 235 to be searched, essentially implements a fully-associative runahead cache which contain the address and data associated with the last N retired stores, where N is the number of store instructions that can be contained in the store queue 235. A separate explicit runahead cache structure is not necessary to implement the improved store-to-load forwarding scheme of the present invention. The present invention allows the store instructions to write their results (address and data) to the store queue 235 during runahead mode, but does not allow store instructions to update processor 200 caches and system memory 136 with data. The present invention also allows younger runahead load instructions to search retired store queue entries (address and data) for matching addresses and to utilize the data if an address match occurs.

It is understood that the use herein of specific names are for example only and not meant to imply any limitations on the invention. The invention may thus be implemented with different nomenclature/terminology and associated functionality utilized to describe the above devices/utility, etc., without limitation. While the present invention has been particularly shown and described with reference to a preferred embodiment, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-storage medium that contains a program product. That is, the present invention can also be embodied as programs defining functions in the present invention as computer-readable codes on a computer-readable medium. The computer-storage medium may be a computer-readable medium, which can include a computer-readable recording medium and/or a computer-readable transmission medium, and/or a computer-readable/writeable recording medium. The computer-readable recording medium is any data storage device that can store data which can be thereafter read by a computer system. Examples of a computer-readable recording medium include read-only memory (ROM), and examples of a computer-readable/writeable recording medium include random-access memory (RAM), CD-ROMs, magnetic tapes, floppy disks, hard disk drives, memory stick devices, and optical data storage devices. The computer-readable recording medium can also be distributed over network coupled computer systems so that the computer-readable code is stored and executed in a distributed fashion. The computer-readable transmission medium can transmit data via a wired or wireless configuration (e.g., wired or wireless data transmission through the Internet). Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalent.

What is claimed is:

1. A method of performing a store-to-load forwarding operation in a processor of a computer system having a memory, the method comprising:
   executing a first load instruction that results in a first load cache miss condition;
   in response to occurrence of the first load cache miss condition, the processor:
      copying a current state of the processor to a restore point in the memory;
      entering a runahead mode of operation, wherein during the runahead mode of operation the processor:
         continually executing a plurality of subsequent instructions that are more recent than the first load instruction, wherein the plurality of subsequent instructions include a second load instruction;
         forwarding speculative values produced by the plurality of subsequent instructions to new store entries within the store queue, wherein the store queue is disposed within an execution core of the processor;
         in response to encountering a second load cache miss condition of the second load instruction during the runahead mode and prior to a time that the first load instruction completes processing the first load cache miss condition, stalling for a period of time; and
         providing at least one subsequent load instruction included in the plurality of subsequent instructions being executed during the runahead mode access all store entries of the store queue, wherein each store entry includes an address and data associated with a store instruction; and
      in response to the first load instruction completing:
         retrieving the restore point; and
         executing a first subsequent instruction of the plurality of subsequent instructions from the restore point while continuing concurrent processing the second load instruction from the memory.

2. The method of claim 1, wherein the store entries are associated with both un-retired store instructions which are included in the plurality of subsequent instructions and retired store instructions which were executed by the processor prior to the execution by the processor of the first load instruction, and wherein the store queue includes a head pointer and a tail pointer to point to at least one store entry of the store queue.

3. The method of claim 2, wherein the head and tail pointers both point to a same store entry.

4. The method of claim 1, wherein the store queue is configured as a circular first in first out (FIFO) buffer.

5. The method of claim 1, wherein the first load instruction completes processing the encountered first load cache miss condition in response to the first load instruction retrieving valid data from an address associated with the first load instruction from a memory of the computer system, which is external to the processor.

6. The method of claim 1, wherein the at least one subsequent load instruction utilizes the data of one of the store entries associated with a retired store instruction in response to an address stored in the one of the store entries matching an address associated with the at least one subsequent load instruction.

7. A computer system, comprising:
   a main memory;
   a processor communicatively coupled to the main memory, where the processor includes a store queue which includes a plurality of store entries each including an address and data associated with a store instruction that has been executed by the processor during a runahead mode of operation wherein the processor:
      executes a first load instruction that results in a first load cache miss condition;
      in response to the first load cache miss condition, the processor:
         copies a current state of the processor to a restore point in a memory;
         enters into a runahead mode of operation, wherein during the runahead mode of operation the processor:
            continually executes a plurality of subsequent instructions that are more recent than the first load instruction, the plurality of instructions including a second load instruction;
            forwards speculative values produced by the plurality of subsequent instructions to new store entries within the store queue, wherein the store queue is disposed within an execution core of the processor;
            in response to encountering a second load cache miss condition of the second load instruction during the runahead mode and prior to a time that the first load instruction completes processing the first load cache miss condition, stalls for a period of time; and
            provides at least one subsequent load instruction included in the plurality of subsequent instructions being executed during the runahead mode access all store entries of the store queue, wherein each store entry includes an address and data associated with a store instruction; and
         in response to the first load instruction completing:
            retrieves the restore point; and
            executes a first subsequent instruction of the plurality of subsequent instructions from the restore point while continuing concurrent processing the second load instruction from the memory.

8. The computer system of claim 7, wherein the store entries are associated with both un-retired store instructions which are included in the plurality of subsequent instructions and retired store instructions which were executed by the processor prior to the execution by the processor of the first load instruction, and wherein the store queue includes a head pointer and a tail pointer to point to at least one store entry of the store queue.

9. The computer system of claim 7, wherein the head and tail pointers both point to a same store entry.

10. The computer system of claim 7, wherein the store queue is configured as a circular first in first out (FIFO) buffer.

11. The computer system of claim 7, wherein the first load instruction completes processing the encountered first load cache miss condition in response to the first load instruction retrieving valid data from an address associated with the first load instruction from a memory of the computer system, which is external to the processor.

12. The computer system of claim 7, wherein the at least one subsequent load instruction utilizes the data of one of the store entries associated with a retired store instruction in response to an address stored in the one of the store entries matching an address associated with the at least one subsequent load instruction.

13. A computer program product, comprising:
- a computer-readable recording storage medium; and
- program code embodied in the computer-readable storage medium that when executed by a computer enables the computer to perform the functions of:
  - executing instructions in a processor including a first load instruction that results in a first load cache miss condition;
  - in response to the first load cache miss condition:
    - copying a current state of the processor to a restore point in a memory;
    - entering a runahead mode of operation, wherein during the runahead mode of operation the processor:
      - continually executing a plurality of subsequent instructions that are more recent than the first load instruction, wherein the plurality of subsequent instructions includes a second load instruction;
      - forwarding speculative values produced by the plurality of subsequent instructions to new store entries within the store queue, wherein the store queue is disposed within an execution core of the processor;
      - in response to encountering a second load cache miss condition of the second load instruction during the runahead mode and prior to a time that the first load instruction completes processing the first load cache miss condition, stalling for a period of time; and
      - providing at least one subsequent load instruction included in the plurality of subsequent instructions being during the runahead mode access all store entries of the store queue, wherein each store entry includes an address and data associated with a store instruction; and
    - in response to the first load instruction completing;
      - retrieving the restore point; and
      - executing a first subsequent instruction of the plurality of subsequent instructions from the restore point while continuing concurrent processing the second load instruction from the memory.

14. The computer program product of claim 13, wherein the store entries are associated with both un-retired store instructions which are included in the plurality of subsequent instructions and retired store instructions which were executed by the processor prior to the execution by the processor of the first load instruction, and wherein the store queue includes a head pointer and a tail pointer to point to at least one store entry of the store queue.

15. The computer program product of claim 14, wherein the head and tail pointers both point to a same store entry.

16. The computer program product of claim 13, wherein the store queue is configured as a circular first in first out (FIFO) buffer.

17. The computer program product of claim 13, wherein the first load instruction completes processing the encountered first load cache miss condition in response to the first load instruction retrieving valid data from an address associated with the first load instruction from a memory of the computer system, which is external to the processor.

18. The computer program product of claim 13, wherein the at least one subsequent load instruction utilizes the data of one of the store entries associated with a retired store instruction in response to an address stored in the one of the store entries matching an address associated with the at least one subsequent load instruction.

* * * * *